(No Model.)
J. G. MORRISON.
MACHINE FOR MAKING CORES FOR CASTINGS.
No. 299,998. Patented June 10, 1884.
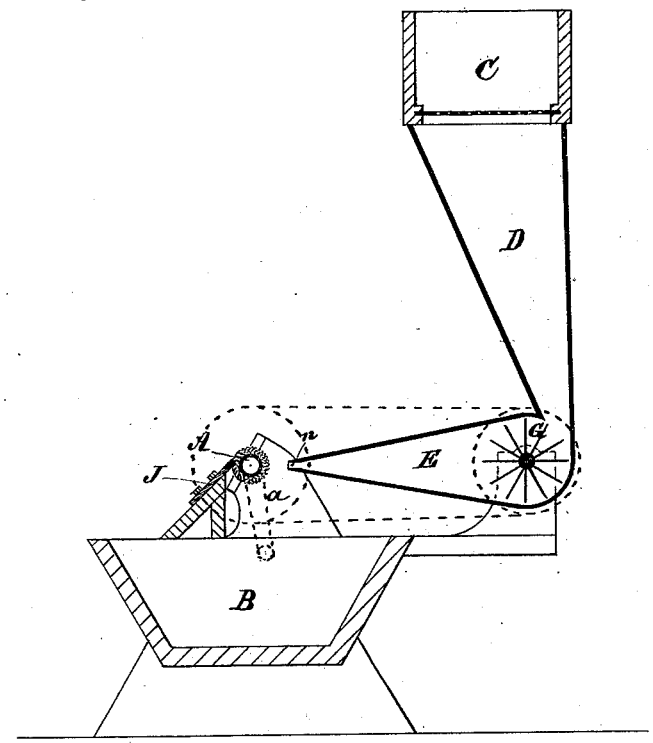
WITNESSES:
E. Lindgens
G. Sarniguet
INVENTOR
John G. Morrison
BY
Henry E. Roeder
ATTORNEY

UNITED STATES PATENT OFFICE.

JOHN G. MORRISON, OF WILLIAMSBURG, NEW YORK.

MACHINE FOR MAKING CORES FOR CASTINGS.

SPECIFICATION forming part of Letters Patent No. 299,998, dated June 10, 1884.

Application filed February 26, 1884. (No model.)

*To all whom it may concern:*

Be it known that I, JOHN G. MORRISON, a citizen of the United States, and a resident of Williamsburg, Kings county, State of New York, have invented a new and useful Improvement in Machines for Making Cores for Castings, of which the following is a specification.

The nature of my invention consists in combining with the revolving core-bar and the usual stationary cutter a revolving wing-wheel and funnel-shaped horizontal pipe with a contracted mouth or opening, through which the sand falling upon the wing-wheel is carried against the core-bar to form the desired core.

In the accompanying drawing a vertical cross-section of my improved machine is shown.

A bar or pipe, A, of the required size and length to form the center of the core, is supported in suitable bearings, a a, over a trough, B, and provided with a suitable handle or pulley at one of its ends to give the desired rotary motion to said bar or pipe. Against the front of this core bar or pipe A a knife or scraper, J, is arranged the proper distance from said pipe. It may be desired to cover the core-pipe with sand, which said scraper J will smooth and scrape off any surplus of sand and produce a smooth surface on the finished core. Some distance back of this revolving core-pipe A a trough or sieve, C, is arranged above a funnel-shaped pipe, D, below which a brush or wing-wheel, G, is placed, the mouth of the funnel-shaped pipe D being so arranged as to deliver the sieved sand falling from the sieve C upon the after part of the wing-wheel G. The wing-wheel G is placed in a horizontal funnel-shaped pipe, E, terminating a few inches from the core-pipe A, or about three inches from the outer circumference of the finished core, and is made with a very narrow opening, $n$, in a line with the center of the core-pipe A. The sand falling out of the sieve C upon the after part of the wing-wheel G is propelled by the wings of said wheel, and, assisted by the current of air created by the revolving of said wheel, is thrown in a very fine spray against the core-pipe A until the required quantity has adhered to the same. The shaft of this wing-wheel G may be connected by a belt with the shaft of the core-pipe A and receive its motion from the same. The sand not adhering to the core-pipe A, as well as the scraped-off and surplus sand, falls into the trough B, into which a suitable conveyer may be placed to carry the sand up to the sieve C, to be used again.

It will be understood that the wing-wheel G must be nearly the length of the core to be made, and the mouth or opening $n$ of the horizontal funnel-shaped pipe E must be somewhat longer than the extreme length of the finished core.

What I claim as my invention, and desire to secure by Letters Patent, is—

The combination, with the revolving core-bar A and stationary cutter J, of the revolving wing-wheel G and funnel-shaped horizontal pipe E, with contracted mouth or opening $n$, substantially as and for the purpose described.

JOHN G. MORRISON.

Witnesses:
HENRY E. ROEDER,
J. B. NONES.